United States Patent

Greiner et al.

[11] 4,170,255
[45] Oct. 9, 1979

[54] PNEUMATIC TIRES

[75] Inventors: Henri Greiner, Conflans Ste Honorine; Claude LeFaucheur, Paris, both of France

[73] Assignee: Pneumatiques Caoutchouc Manufacture et Plastiques Kleber-Colombes, Colombes, France

[21] Appl. No.: 870,490

[22] Filed: Jan. 18, 1978

[30] Foreign Application Priority Data

Jan. 18, 1977 [FR] France .............................. 77 01372

[51] Int. Cl.$^2$ .............................................. B60C 9/18
[52] U.S. Cl. ...................... 152/361 FP; 152/361 DM
[58] Field of Search ................. 152/361 FP, 361 DM, 152/361 R, 357, 354

[56] References Cited

U.S. PATENT DOCUMENTS

| T938,009 | 9/1975 | Weissert et al. | 152/361 FP |
|---|---|---|---|
| 3,692,080 | 9/1972 | Boileau | 152/361 FP |
| 3,717,190 | 2/1973 | Boileau | 152/361 FP |
| 3,831,656 | 8/1974 | Senger et al. | 152/361 FR |
| 3,842,884 | 10/1974 | Bertrand | 152/361 R |
| 3,861,441 | 1/1975 | Oyoun | 152/361 FP |
| 3,949,797 | 4/1976 | Mirtain et al. | 152/361 DM |
| 3,949,799 | 4/1976 | Montagne | 152/361 FR |
| 3,973,612 | 8/1976 | Mezzanotte | 152/361 DM |
| 3,985,173 | 10/1976 | Masson | 152/361 FP |

Primary Examiner—Francis S. Husar
Assistant Examiner—Lawrence E. Williams
Attorney, Agent, or Firm—Brisebois & Kruger

[57] ABSTRACT

A pneumatic tire of low cross-section of a height to width ratio equal to or less than 0.8, and which is suitable for use at high speed. The tire has a radial carcass and a crown belt interposed between the radial carcass and the tire tread for the width of the tread surface, the belt being formed from two main plies of unequal width composed of high modulus flexible cords which are orientated in opposite direction at small angles, one at least of the plies having its lateral edges folded over and flattened against the inner face of the belt. A third, narrower, belt ply is positioned on the outer face of the belt against the central part of the ply whose edges are folded. The width of the third ply is between the width of the narrower and unfolded ply and the width of the space between the edges of the wider folded ply.

6 Claims, 3 Drawing Figures

PNEUMATIC TIRES

BACKGROUND OF THE INVENTION

The present invention relates to improvements in pneumatic tires having crown belts, which are intended for fitting to vehicles capables of travelling at high speeds, of the order of 200 to 300 km/h, such as touring cars and sports or competition cars.

Experience which has been gained in recent years has shown that a type of crown belt which is particularly suitable for such tires is that in which the lateral edges are folded over and flattened against one of the faces of the belt. Such belts are more resistant to the stresses and faults caused by travelling at high speed. However, it has been found that apparently minimal changes in the dimensions selected for the belt (the width of the belt and the relative width of the folded edges), in the materials selected for use (more or less flexible textile or metal cords), and in the angles of inclination selected for the cords relative to the longitudinal direction of the belt, have a very substantial effect both on the ability of the tires to stand up to high speeds and on the often conflicting qualities of roadworthiness which they are called upon to exhibit, such as a good ride (in particular on poor roads), road holding in a straight line and on corners, and the speed and uniformity of tread wear.

The invention proposes improved embodiments of belt of this kind with folded edges, which make it possible to achieve not only an excellent ability to stand up to high speeds but also a very good compromise between the various qualities of roadworthiness required, while at the same time being very easy to manufacture.

SUMMARY OF THE INVENTION

Accordingly, in a pneumatic tire of low cross-section equal to or less than 0.8 which is suitable for use at high speed, of the kind having a radial carcass and a crown belt interposed between said radial carcass and the tire tread for the width of the tread surface, said belt being formed from two main plies of unequal width composed of high modulus flexible cords which are orientated in opposite directions at small angles, one at least of said plies having its lateral edges folded over and flattened against one face of the belt, the invention consists in that a third, narrower belt ply is positioned on the other face of said belt against the central part of said ply whose edges are folded.

BRIEF DESCRIPTION OF THE DRAWINGS

In order that the invention may be more clearly understood, reference will now be made to the accompanying drawings, which show certain embodiments thereof by way of example and in which.

DETAILED DESCRIPTION OF PREFERRED EMBODIMENTS

Figure 1:
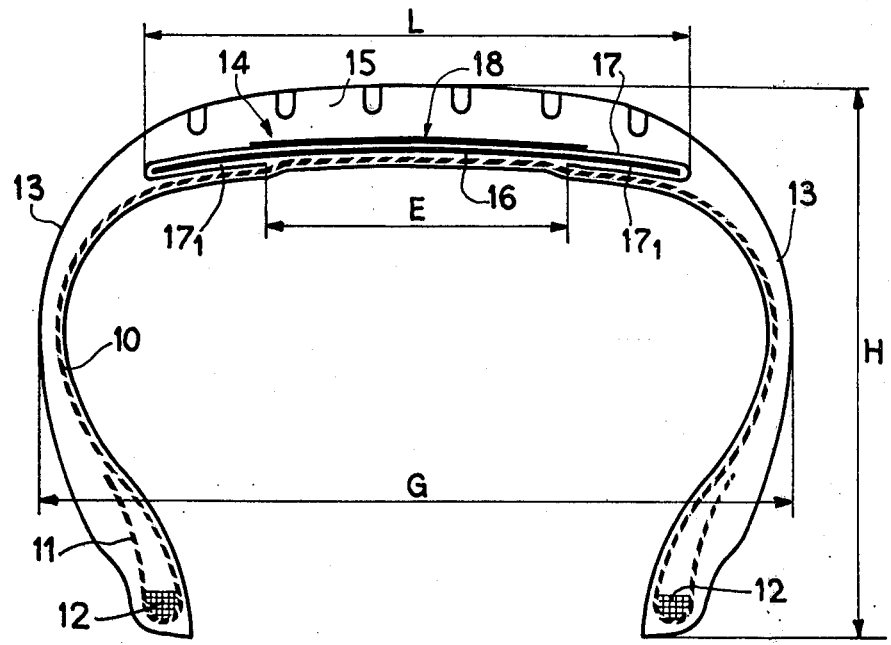
FIG. 1 is a cross-sectional view of a tire having a folded-edge belt.

The pneumatic tires according to the invention, which are such as are illustrated in FIG. 1 of the accompanying drawings, have a carcass 10 which is formed from one or more plies of weftless or sparsely wefted cord fabric consisting of flexible cords such as cords made of rayon, nylon, aromatic polyamide, polyester, glass fibre or metal, these cords being orientated in meridian (i.e. radial) or almost meridian (i.e. radial) planes of the tire. The edges 11 of the carcass plies are folded around the wires 12 in the beads. The carcass is covered on the sides by side-wall bands 13 and on its crown it carries a belt 14 which is inextensible in the circumferential direction. The belt itself is covered by a tread 15 which carries a pattern appropriate to the use for which the tire is intended and the width L of the belt as a whole is approximately equal to the width of the tread surface.

The shape illustrated in FIG. 1 is the cross-sectional shape of the tire when mounted on a normal rim. It is close to the characteristic shape of low profile tires in which the ratio of the cross-sectional height H over the cross-sectional width G is equal to or less than 0.8 with the tread surface relatively flat or slightly cambered in the transverse direction.

In the embodiment of FIG. 1, the belt 14 is formed from three reinforcing plies composed of parallel flexible cords, namely two main plies 16, 17 and one supplementary ply 18. Ply 16 is a flat annular ply whose width is slightly less than the width L of the belt while the developed width of ply 17 is considerably greater and its lateral edges $17_1$ are folded around the edges of ply 16 and are flattened against the inner face of ply 16. The width of ply 17 is not however greater than 1.5 times the width of the belt so that the extremities of the folded edges $17_1$ are spaced apart transversely by a distance E at least equal to half the width L of the belt. Depending on the size of the tire, the width of the folded edges is thus of the order of 15 to 70 millimeters approximately so that there is a good overlap with the edges of ply 16 and so that the lateral areas of the belt are strengthened and stiffened. The mains plies 16, 17 are formed from flexible cords orientated in opposite directions at small angles of not more than 35° to the longitudinal or equatorial direction of the tire.

The third ply 18 is a flat, appreciably narrower ply which is applied to the central part of the ply 17, to the face of the belt which is opposite from that against which the folded edges $17_1$ are flattened and, in the present case, to the outer face of the belt. The width 1 of this narrower ply 18 is, preferably, at least equal to the distance E between the folded edges $17_1$ but is nevertheless less than the width L of the belt so that its edges are distant from the edges of the belt.

Figure 2:
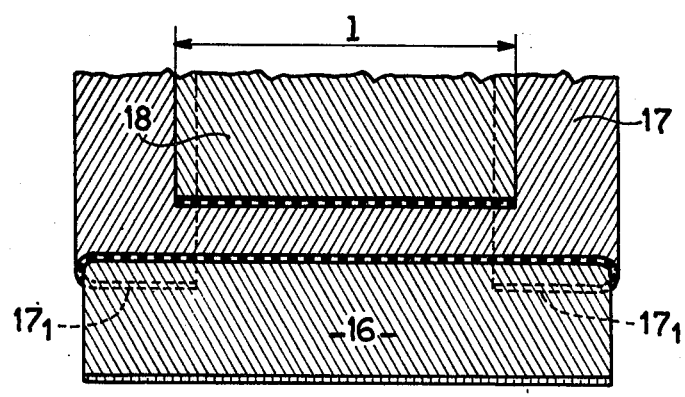
FIG. 2 is a plan view of part of the belt of this tire.

As FIG. 2 shows, the cords in the main plies 16, 17 are orientated in opposite directions so as to intersect from ply to ply and only the cords in the folded edges $17_1$ are orientated in the same direction as the cords in the parts of ply 16 which are overlapped by these edges. In this respect and to stiffen the lateral areas of the belt embraced by the folded edges $17_1$ to a greater extent, it is advantageous to make the angles of the cords in plies 16 and 17 of different sizes, such as a small angle of the order of 10° to 35° for the cords in the flat ply 16 and an angle different by at least 5° for the cords in the folded ply 17, which angle may be of the order of 15 to 30° in the other direction.

The cords in the narrow ply 18 may be indicated in the same direction and at the same angle as the cords in the flat ply 16, as shown in FIG. 2, so that the cords in the three successives superimposed plies cross one another. However, it is also possible for the cords in the narrow supplementary ply 18 to be given any other orientation and any other angle of inclination of between 0° and 90° relative to the longitudinal direction so as to adjust the characteristics of the behaviour of the tire.

The cords making up the two main plies of the belt 14 are advantageously all cords of high modulus and high strength in order to endow the belt with a high resistance to extension in the circumferential direction and high stiffness in its plane, which is of assistance in achieving good road holding and low drift. Use is preferably made of metal cords or textile cords having a strength close to or greater than 10 daN at 2% extension, such as cords of aromatic polyamide.

The three plies 16, 17, 18 may be formed from cords of the same kind. They may alternatively be formed from different cords. A construction which is advantageous from the point of view of price and quality consists in having a flat ply 16 of metal cords, a folded ply 17 of high modulus textile cords, and a narrow ply 18 of either textile or metal cords depending on the size of the tire and the degree of stiffness required.

The belt construction illustrated in FIGS. 1 and 2 is particularly advantageous for achieving a good resistance to high speeds because, in this construction, the downward folded edges $17_1$ are held between the carcass 10 and the belt and the belt is thus effectively held in place.

Figure 3:
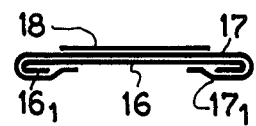
FIG. 3 is a schematic view of a modified construction for the previous belt.

FIG. 3 illustrates a modified construction in which the belt contains a relatively wide ply 16 whose edges $16_1$ are folded at the same time as the edges $17_1$ of ply 17. The widths of the two plies 16, 17 may be selected in such a way that the flattened down edges $16_1$ and $17_1$ are also stepped towards the middle of the belt. The folding of edges $16_1$ and $17_1$ preferably takes place onto the inner face of the belt, the narrow ply 18 being applied to the opposite face from that which carries the folds $17_1$, i.e. to the outer face of ply 17.

We claim:

1. In a pneumatic tire suitable for high speed use in which the ratio of the cross-sectional height of the tire to its cross-sectional width is equal to or less than 0.8 and of the kind having a radial carcass and a crown belt interposed between said radial carcass and the tire tread for the width of the tread surface, said belt being formed from two main plies of unequal width composed of high modulus flexible cords which are orientated in opposite directions at small angles, one at least of said plies having its lateral edges folded over and flattened against one face of the belt, the invention which consists in that a third, narrower, belt ply is positioned on the other face of said belt which is opposite to said face having the folded portions against the central part of said ply whose edges are folded.

2. A tire according to claim 1, wherein said lateral edges of said wider ply of said main plies are folded over against the inner face of said belt and said third, narrower ply is positioned on the outer face of said belt.

3. A tire according to claim 1, wherein the width of said third ply of said belt lies between the width of the said narrower and unfolded ply of said main plies and the width of the space between the edges of said wider and folded ply of said main plies.

4. A tire according to claim 1, wherein said belt comprises a flat ply of approximately the width of the tread surface and made from metal cords, a wider ply of high modulus textile cords whose edges are folded over against one face of said metal ply, and a narrow ply of high modulus cords which is applied to the opposite face of said folded-edge ply.

5. A tire according to claim 4, wherein said high modulus textile cords for said wider ply consist of an aromatic polyamide.

6. A tire according to claim 4, wherein said high modulus cords for said narrow ply consist of metal.

* * * * *